April 20, 1954 R. M. DEANESLY 2,675,884
RECOVERY OF LIQUIDS FROM GAS-OIL MIXTURES
Original Filed May 25, 1950
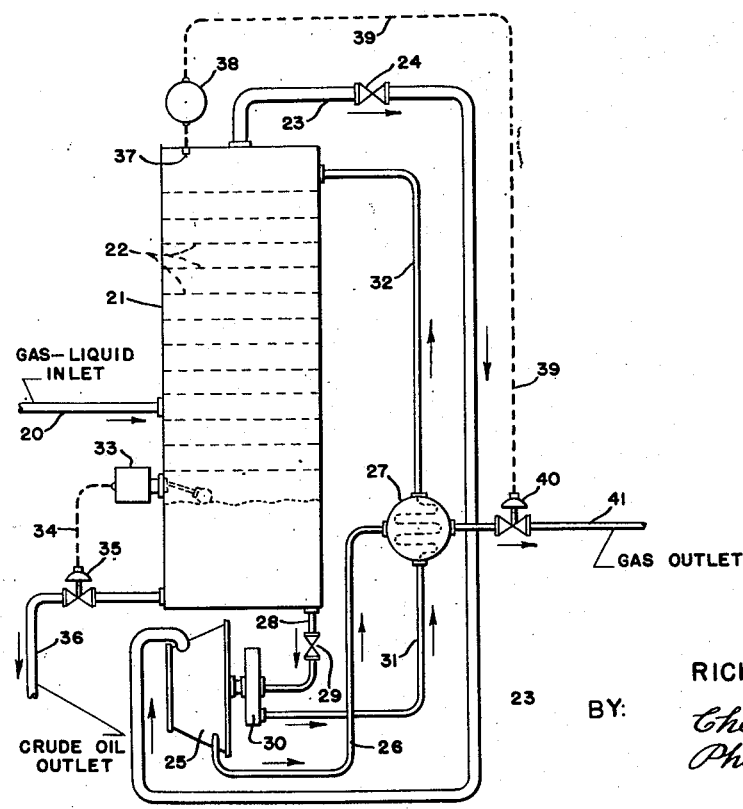
INVENTOR.
RICHARD M. DEANESLY
BY Chester J. Giuliani
Philip T. Liggett
ATTORNEYS:

Patented Apr. 20, 1954

2,675,884

UNITED STATES PATENT OFFICE 2,675,884

RECOVERY OF LIQUIDS FROM GAS-OIL MIXTURES

Richard M. Deanesly, Hinsdale, Ill., assignor to Universal Oil Products Company, Chicago, Ill., a corporation of Delaware Original application May 25, 1950, Serial No. 164,271. Divided and this application March 31, 1952, Serial No. 279,601

6 Claims. (Cl. 183—2.7)

This is a division of my previously filed copending application Serial Number 164,271, filed May 25, 1950.

This invention relates to an improved method for effecting a greater recovery of liquids from gas-crude oil mixtures flowing at substantial superatmospheric pressures from producing wells.

Where crude oil flows at a substantially high superatmospheric pressure from a well accompanied by casinghead gas, and under conditions where gas to oil ratios of several hundred cubic feet per barrel prevail, it is known to be advantageous to minimize the production of gas by employing two or more stages of pressure reduction with interstage gas separation. In addition to reducing the overall gas to oil ratio, the multistage pressure let-down provides a larger part of the gas of low condensible content and at superatmospheric pressure which is more suitable for pipe line transmission. Also, along with an increase in the liquid recovery, the resulting liquid crude has a lower specific gravity permitting a greater monetary return.

It is a principal object of this invention to effect the cooling of a mixed gas-crude oil stream in a manner utilizing a heat exchange zone and a suitable work expansion type of engine, so that mechanical energy may be produced and dissipated as the pressure of at least a portion of the mixed stream is reduced; whereby to permit the separation of liquid from gas at a lower and more favorable temperature, and increase the liquid recovery from the oil well stream.

It is a further object of the present invention to provide a heat exchange and pressure reducing arrangement providing for the pressure reduction of the mixed stream from the producing well to be accomplished through turbo-expansion means and thereby produce mechanical energy along with polytropic expansion.

It is a still further object of the present invention to effect increased liquid recovery from a mixed stream of gas and liquid crude oil by passing the latter through a combined heat exchange and separation zone which connects with a turbine type expansion engine, with the latter suitable for effecting a substantially great temperature and pressure reduction in at least a portion of the charge stream and the production of mechanical energy thereby.

In a broad embodiment, the present invention provides for an increase in the liquid recovery from a mixed stream of gas and liquid crude oil issuing from a well at a substantially high superatmospheric pressure, in a manner which comprises, passing the stream through at least one combination of heat exchange and gas-liquid separation zone and work expansion stage, with the mixed stream passing in a confined path and in heat exchange relationship with a reduced temperature gas and reduced temperature liquid, as hereinafter set forth, continuously withdrawing a resulting partially cooled stream from the separation zone and continuously expanding it within a work expansion means effecting the generation of mechanical energy and a further reduced temperature effluent stream, continuously passing the resulting effluent stream in a heat exchange flow whereby to effect the cooling of the mixed gas-liquid stream as aforesaid, continuously withdrawing gas from the upper portion of the separation zone, and continuously discharging liquid from the lower end of the zone.

In a preferable arrangement, the work expansion means comprises a turbo-expansion engine, Pelton wheel, or the like, such that for example fan blades may be turned thereby to dissipate the energy. Alternatively this energy may be used to operate a pump, gas blower for transporting the gas, or for other purposes. Thus, the work done by the well head fluid against fan blades, a pump, or the like, that is the polytropic gas expansion through the turbine results in a high degree of cooling of the incoming well head fluid stream to permit the separation of liquid from gas at relatively low and favorable temperature conditions. The degree of cooling maintained within the gas-liquid separation zone may be varied in each individual case by the pressure reduction which is controlled by the relief valve on the effluent gas from the separator. The extent of cooling permissible in any given case being limited by the tendency to gas hydrate formation or formation of ice from accompanying water, as well as by economic factors of gas disposal.

Still other embodiments or arrangements of the improved method of operation will be described hereinafter. Also, one or more similar units or arrangements of heat exchange, turbo-expansion, and gas and liquid separation may be utilized in series, depending upon the well head pressure and other economic considerations. The increase in quantity of liquid recovered and the further lowering of specific gravity of the liquid stream, which may be obtained by use of additional stages, or alternatively the availability of a part of the gas at higher pressure must be balanced against the cost of their installation and maintenance.

Reference to the accompanying diagrammatic drawing and the following description thereof will serve to illustrate more clearly the present improved method of obtaining greater liquid recovery and a lower specific gravity oil from a mixed gas-oil stream issuing directly from a producing well. However, it is not intended to limit the invention to the particular structural and physical arrangements of equipment which are shown in this drawing.

Referring more particularly to the drawing, there is shown an arrangement of turbo-expansion engine and heat exchange flow, effecting the pressure reduction, cooling, and increased liquid recovery, while at the same time, enabling multi-stage scrubbing of the gaseous components by the cooled liquid stream, whereby the separation of the gaseous components from the liquid components is sharpened. The mixed well-head stream of crude oil and casing head gas is passed by way of line 20 to an intermediate point or zone of a separating chamber 21. The chamber 21 comprises a combined scrubber-separator column having suitable packing material providing an extended surface, or alternatively, a plurality of bubble decks 22, as indicated in the drawing, similar to those which may be used in distilling or absorber columns in the petroleum industry. Uncondensed gas withdrawn from the upper portion of chamber 21 by way of line 23 and valve 24 is expanded within a suitable turbo-expander or expansion engine 25, whereby mechanical work is done by the gas released. The reduced pressure gaseous stream is passed from the expander 25 by way of line 26 to a suitable heat exchanger 27, in which the expanded and chilled gas cools a part of the liquid from the reservoir at the bottom of the scrubber-separator column 21. This liquid crude oil is passed by way of line 28, having valve 29, to a pump 30, and from the latter by way of line 31 through the heat exchanger 27. The pump 30, which circulates the liquid from the lower portion of the chamber 21, may be driven by the turbo-expander 25 as shown, or alternatively, circulation may be obtained by an eductor or gas lift device actuated by a side stream of the inlet gas-liquid mixture from the well. The cooled liquid stream from the heat exchanger 27 passes by way of line 32 into the upper portion of the separating and scrubbing column 21 in order to provide a suitable liquid scrubbing stream passing downwardly over the plurality of decks 22.

A suitable liquid level controller 33 may be mounted in connection with chamber 21 to maintain a desired level of liquid crude oil within the lower portion of the chamber, with the controller 33 connecting by way of line 34 to a control valve 35 and outlet line 36. Pressure control of the column may be maintained by means of a suitable pressure sensitive element 37 and pressure controller 38. The latter connecting by way of line 39 to a pressure control valve 40 maintained in the gas outlet line 41.

In addition to the embodiments of my invention which have been shown and described, there are others more or less complex which are possible within the essential framework of this improved type of operation, which relates to the employment of an expansion engine operating on the well-head fluid, or at least a part thereof, to effect the cooling which is in turn employed by means of suitably installed heat exchange means to precool all or a part of the well-head fluid, whereby the separation of gas from the liquid crude oil takes place under more favorable conditions of temperature and pressure than would otherwise be possible.

Also, it may again be noted that while single units of heat exchange and pressure reduction are indicated in the accompanying drawing, that two or more of these units or arrangements placed in series may be economically desirable in order to provide more stages of pressure reduction and additional heat exchange zones, whereby to effect higher pressures for withdrawing a part of the resulting uncondensed gas.

I claim as my invention:

1. A method for increasing liquid recovery from a mixed stream of gas and liquid crude oil issuing from a well at a substantially high superatmospheric pressure, which comprises, introducing said stream into a gas and liquid separation zone, withdrawing a gaseous stream from the upper portion of said zone and continuously expanding at least a portion thereof in turbo-expansion means effecting the generation of mechanical energy and a reduced temperature effluent stream, withdrawing liquid crude oil from the lower portion of said separation zone and pumping at least a portion thereof to the upper portion of said separation zone to countercurrently contact and strip the gaseous stream being withdrawn from the upper portion of said zone, and supplying the energy for pumping of said crude oil stream from the expansion of said gaseous stream through said turbo-expansion means.

2. A method for increasing liquid recovery from a mixed stream of gas and liquid crude oil issuing from a producing well at a substantially high superatmospheric pressure, which comprises, passing said stream into a confined gas and liquid separation zone, continuously withdrawing a resulting partially cooled gaseous stream from the upper portion of said zone and continuously expanding it within confined turbo-expansion means effecting the generation of mechanical energy and a reduced temperature effluent stream, continuously withdrawing a liquid crude oil stream from the lower portion of said separation zone and passing it in indirect heat exchange relationship with said reduced temperature effluent stream from said turbo-expansion means and passing a resulting lower temperature crude oil stream to the upper portion of said separation zone, whereby the latter may pass in heat exchange relationship with said gas-liquid mixed stream being introduced to said separation zone, continuously withdrawing resulting liquid crude from the lower portion of said zone, and continuously discharging the reduced pressure gaseous stream from said turbo-expansion means and heat exchange zone.

3. The method of claim 2 further characterized in that said turbo-expansion means provides mechanical energy for pumping said liquid crude oil from the lower portion of said separation zone to said heat exchange zone for said indirect heat exchange flow with said reduced temperature effluent stream.

4. The method of claim 3 still further characterized in that said cooled liquid stream from said heat exchange zone passes from the upper portion of said separation zone downwardly through the latter in a manner effecting the scrubbing of the gaseous stream released from said gas-liquid mixture being introduced into an intermediate portion of said separation zone.

5. Apparatus for effecting an increased liquid recovery from a gas-crude oil mixture flowing from a producing well, which comprises in combination, inlet means for said mixture connecting with an intermediate portion of an elongated vertically disposed separation chamber, a gas conduit connecting the upper portion of said chamber with turbo-expansion means, additional conduit means connecting the outlet of said turbo-expansion engine with a heat exchange chamber, liquid conduit means connecting the lower portion of said separation chamber with said heat exchange chamber, and additional liquid conduit means from the latter connecting with the upper portion of said separation chamber, gas outlet means from said heat exchange chamber, and crude oil outlet means from the lower portion of said separating chamber.

6. The apparatus of claim 5 further characterized in that said turbo-expansion engine drives pumping means connecting with said liquid conduit means connecting said separation chamber with said heat exchange chamber, and extended surface liquid-vapor contacting means in the upper portion of said separation chamber whereby cooled liquid from said heat exchange chamber scrubs the gaseous components of said well-head mixed stream entering said separation chamber.

References Cited in the file of this patent

UNITED STATES PATENTS

| Number | Name | Date |
|---|---|---|
| 2,134,700 | Brewster | Nov. 1, 1938 |
| 2,241,716 | Roberts, Jr., et al. | May 13, 1941 |
| 2,497,421 | Shiras | Feb. 14, 1950 |
| 2,577,701 | Deming et al. | Dec. 4, 1951 |